Feb. 7, 1950     C. MELIDONI     2,497,008

VALVE STEM SEAL

Filed Oct. 23, 1946     2 Sheets-Sheet 1

CONSTANTINE MELIDONI
*INVENTOR.*

BY Joseph Blacker

*ATTORNEY*

Feb. 7, 1950 — C. MELIDONI — 2,497,008
VALVE STEM SEAL
Filed Oct. 23, 1946 — 2 Sheets-Sheet 2

CONSTANTINE MELIDONI
INVENTOR.

BY Joseph Blacker
ATTORNEY

Patented Feb. 7, 1950

2,497,008

UNITED STATES PATENT OFFICE 2,497,008

VALVE STEM SEAL

Constantine Melidoni, Fort Lee, N. J.

Application October 23, 1946, Serial No. 705,108

2 Claims. (Cl. 286—30)

This invention relates to a valve stem sealing device for preventing leakage between a valve stem and its guide such as may be used for internal combustion engines.

It is well known to those versed in the art that a worn valve stem or a worn valve guide will materially affect the operation of an internal combustion engine.

In internal combustion engines there is a very great tendency to wear the passage in the stem guide as well as the stem itself, so that after the engine is in operation for a considerable time the space between the stem and the stem guide is considerable. This wear has the effect of upsetting carburetion. Furthermore, oil is drawn around the stem into the cylinder.

In prior attempts to solve the problem of sealing valve stems against leakage in internal combustion engines, no provision has been made for compensating for wear of the sealing device. In order to compensate for wear, I provide a split and conically shaped sealing member made of graphite, the sealing member being split substantially tangentially to permit diametrical compression thereof.

In a disclosure herewith, I provide an arrangement whereby a split and conical sealing member is seated in a hollow conical sleeve which is bodily intact and open at both ends. The sealing member is resiliently held in position and tightly engages the valve stem. It is thus possible when wear takes place on the sealing member for the sealing member to move axially into one open end of the conical sleeve whereby further compression can take place of the sealing member. The sealing member becomes reduced in its outer diameter but still contacts the sleeve and the valve stem and is able to continue its sealing engagement with the valve stem.

In the disclosures herewith I also provide another form of device where a conical sleeve is formed integral with the lower portion of a coil spring. It is to be understood, that both embodiments serve the same purpose of providing a housing wherein a split and conical sealing member may be inserted and held in operating relation with the valve stem even though the diameter of the sealing member constantly becomes smaller.

It will be understood that in providing a compound open coil spring wherein one end is formed to provide a closed coil housing portion of tapering form, that I obtain novel results which are totally different than the result obtained where a compound spring is produced having a closed coil cylindrical end such as shown in the patent to O. U. Zerk, No. 1,928,920 of October 3, 1920.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which.

Figure 1:
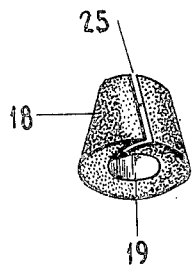
Figure 1 is a perspective view of the conically shaped and tangentially split sealing member.
Figure 4:
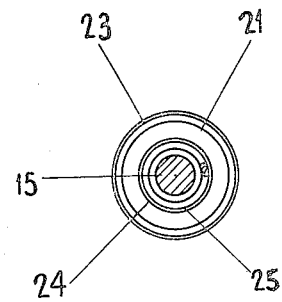
Figure 4 is a cross-sectional view, the section being taken as on line 4—4 in Figure 3, the cylinder block being omitted.
Figure 2:
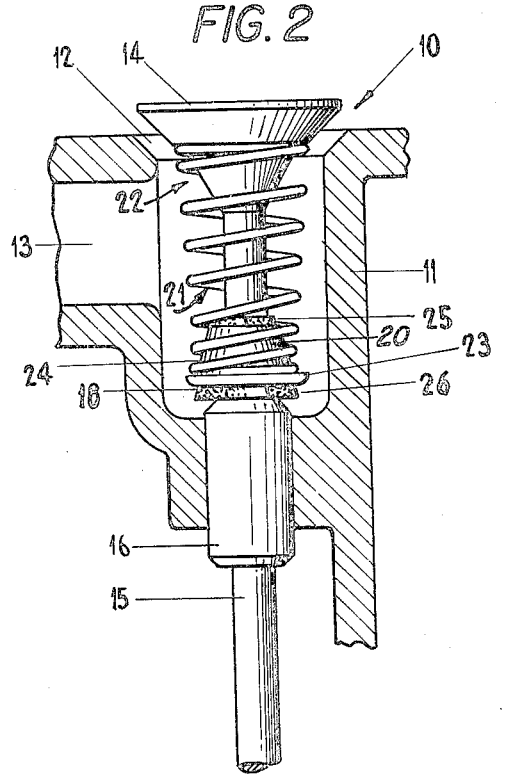
Figure 2 is a fragmentary vertical sectional view through the cylinder of an automobile engine showing an intake valve with the valve stem sealing device applied thereto.
Figure 3:
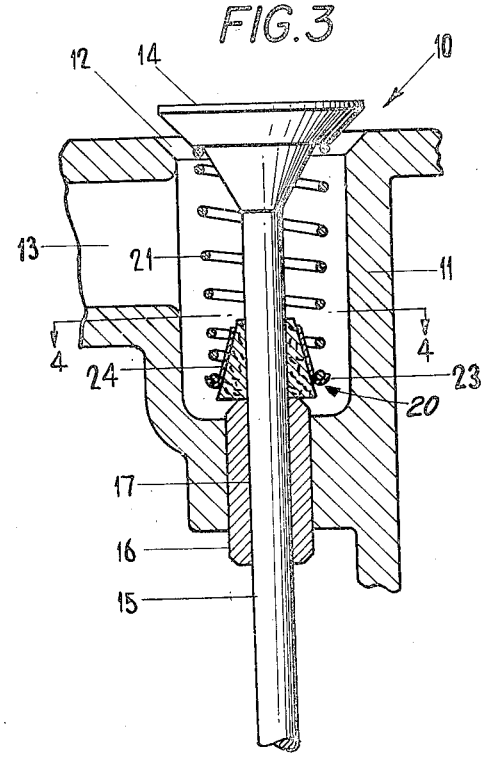
Figure 3 is a central cross-sectional view of the sealing device shown in Figure 2.

In the illustrated embodiment of the invention the numeral 10 indicates a valve stem sealing device which is shown in operating relation with a cylinder block 11 comprising a valve seat 12 and an intake passage 13 which leads to an intake manifold.

The valve seat 12 is closed by means of a valve 14 having a stem 15 journaled in the valve stem guide 16. The valve is normally held seated by means of a compression coil spring (not shown) surrounding the lower end of the valve stem and held thereto in any suitable manner as is known in the art.

In internal combustion engines there is a very great tendency to wear the passage 17 in the stem guide 16, as well as the stem itself, so that after the engine has been in operation for a considerable time the space between the stem and the stem guide is considerable. This wear has the effect of upsetting carburetion. Furthermore, oil is drawn around the stem into the cylinder.

To seal the valve stem and prevent leakage around the stem, I provide a pre-formed conically shaped graphite sealing member 18 having a central sealing aperture 19 and which is split in a direction tangentially of the aperture 19 to permit the material around the aperture to overlap even when the sealing aperture 19 is worn. The sealing member 18 is mounted upon the valve stem 15. I provide a cone-shaped housing 20 which fits over the sealing member and in which the sealing member may move axially to compensate for wear thereof. The sealing member 18 fits tightly around the valve stem 15 and rests upon the upper end of the valve stem guide 16. The sealing member is held down against the guide 16 by a helical coil spring 21 having an enlarged upper end 22 which bears at its upper end against the underside of the head of the valve 14.

The lower end of the spring 21 rests in a circularly dished flange 23 at the large end of a bodily intact conical housing or sleeve 24 in which the sealing member 18 is held in frictional engagement. It is important to note that the upper end 25 of the member 18 projects above the housing or sleeve 24 and that the lower end 26 projects below the said sleeve 24.

The conical sealing member 18 is preferably made from a compressible material which can withstand wear. The tangential split 25 of the sealing member 18 permits its continued compression diametrically. When the sealing member is subjected to considerable wear, it is reduced in diameter and compressed due to the resilient pressure of the spring 21 and the compression permits the sealing member to move upwardly axially into and through the conical housing 22 while retaining its sealing grip on the valve stem and on the valve stem guide.

It is to be noted that the smallest opening in the housings is considerably larger than the diameter of valve stems which have an enlargement at the free end of the valve stem and will readily pass over such enlargement (not shown).

Figure 7:
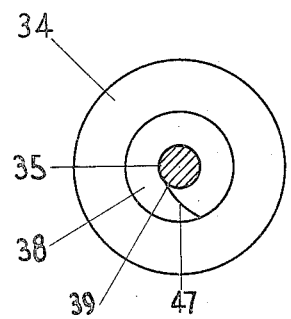
Figure 7 is a cross-sectional view, the section being taken as on line 7—7 in Figure 5.
Figure 8:
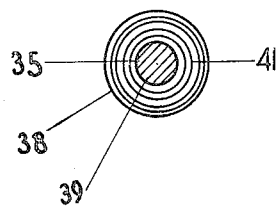
Figure 8 is a cross-sectional view, the section being taken as on line 8—8 in Figure 6.
Figure 5:
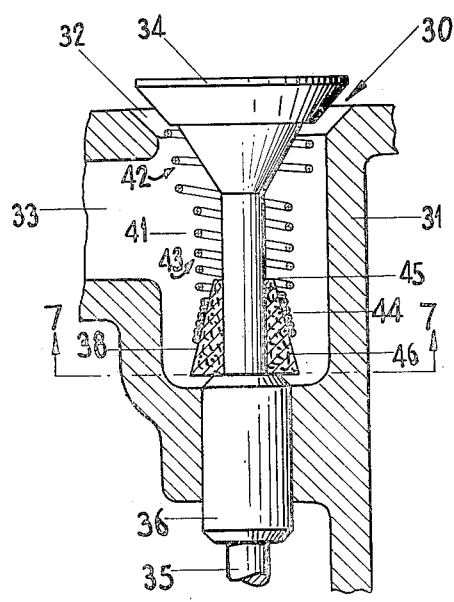
Figure 5 is a central cross-sectional view of a modified valve stem sealing device.
Figure 6:
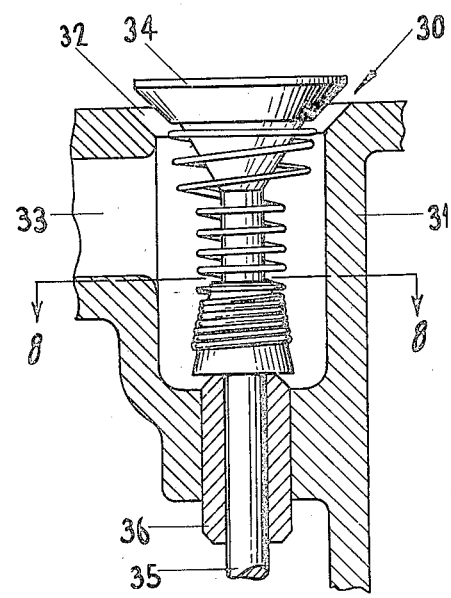
Figure 6 is an elevational view of the sealing device shown in Figure 5.

Figures 5 to 8 inclusive show a modified valve stem sealing device 30 which is shown in operating relation with a cylinder block 31 comprising a valve seat 32 and an intake passage 33 which leads to an intake manifold. The valve seat 32 is closed by means of a valve 34 having a stem 35 journaled in the valve stem guide 36.

To seal the valve stem 35 and prevent leakage around the stem, I provide a conically shaped graphite sealing member 38 having a central sealing aperture 39 and which is split in a direction tangentially of the aperture 39 to permit the material around the aperture to overlap even when the sealing aperture 39 is worn. The sealing member 38 is mounted upon the valve stem 35.

The sealing member 38 fits tightly around the valve stem 35 and rests upon the upper end of the valve stem guide 36. The sealing member is held down against the guide 36 by a compound coil spring 41 having an enlarged open coil helical upper end 42 which bears at its upper end against the underside of the head of the valve 34.

The middle portion 43 of the spring 41 is of cylindrical shape. The lower portion of the spring 41 has its coils closely wound to provide a closed coil spring housing portion 44 of conical form, with the large end of the housing forming the lower end of the spring.

The lower end or housing end of the spring 41 rests on the sealing member 38 in frictional engagement. It is important to note that the upper end 45 of the sealing member 38 projects above the housing 44 and that the lower end 46 projects below the housing 44. It is to be noted that the largest diameter coil of the cone-shaped spring housing 44 stops considerably short of the lower end face of the sealing member 38.

The conical sealing member 38 is preferably made from a material which can withstand wear. The tangential split 47 of the sealing member 38 permits its continued compression diametrically. When the sealing member is subjected to considerable wear, it is reduced in diameter and compressed due to the resilient pressure of the spring 41 and the compression permits the sealing member to move upwardly axially into and through the spring housing portion 44 into the middle portion 43 while retaining its sealing grip on the valve stem and on the valve stem guide.

It is to be noted that the conical housings 24 and 44 in which the sealing members 18 and 38 are housed have their walls directed along straight lines. This linear arrangement is also evident by looking at the outer contour of the sealing members. Both the housings and the sealing members have their outer peripheries lying along the same angular inclination so that there is prearranged easy sliding when a sealing member is within a housing. This arrangement is very important because if the housing walls were made of irregular or curved cross-section and differing from the straight line form shown herewith, there would be no relative motion between these members. This would defeat the purpose of the present invention, the gist of which is to make it possible for the respective sealing members to easily slide out of its housing to compensate for wear on the valve stem.

In accordance with the patent statutes I have described and illustrated the preferred embodiments of my invention, but it will be understood that various changes and modifications can be made therein without departing from the spirit of the invention as defined by the appended claims.

I claim:

1. In a wear compensating seal for a valve stem, a pre-formed cone shaped split sealing member, a compound coil spring having a conical closed coil housing portion enclosing and contacting the smaller end portion of said sealing member for maintaining the surfaces at the split of said sealing member in abutting relation, said spring having a compressible conical open coil portion adapted to cause a pressure on said sealing member and compression of said member against said valve stem to compensate for wear of said sealing member, the largest diameter coil of said cone shaped closed coil housing portion of said spring stopping short of the larger end face of said conical sealing member to permit continued upward movement of said sealing member into said housing portion of said spring for further compressing said sealing member and compensating for wear of said sealing member.

2. In a wear compensating seal for a valve stem, a pre-formed cone shaped split sealing member, a compound coil spring having a conical closed coil housing portion enclosing and contacting the smaller end portion of said sealing member for maintaining the surfaces at the split of said sealing member in abutting relation, said spring having a compressible conical open coil portion adapted to cause a pressure on said sealing member and compression of said member against said valve stem to compensate for wear of said sealing member, said spring having a cylindrical middle portion intermediate said conical portions large enough to permit the small end portion of said sealing member to move upwardly of said spring, the largest diameter coil of said cone shaped closed coil housing portion of said spring stopping short of the larger end face of said conical sealing member to permit continued upward movement of said sealing member into said housing portion of said spring and into said cylindrical middle portion for further compressing said sealing member and compensating for wear of said sealing member.

CONSTANTINE MELIDONI.

REFERENCES CITED

The following references are of record in the file of this patent:

UNITED STATES PATENTS

| Number | Name | Date |
| --- | --- | --- |
| 1,234,084 | Pomeroy | July 17, 1917 |
| 2,062,518 | Lindbloom | Dec. 1, 1936 |
| 2,170,134 | Flick | Aug. 22, 1939 |
| 2,207,400 | Gass | July 9, 1940 |
| 2,240,644 | Focht | May 6, 1941 |